United States Patent [19]
Morofuji et al.
[11] Patent Number: 5,018,640
[45] Date of Patent: May 28, 1991

[54] MULTIPLE COLOR PRINTING METHOD FOR METALLIC CONTAINER AND THIN PLATE METAL AND PRINTED MATTER

[75] Inventors: Akihiko Morofuji; Masaki Morotomi, both of Kanagawa, Japan

[73] Assignee: Toyo Seikan Kaisha Ltd., Tokyo, Japan

[21] Appl. No.: 295,946

[22] PCT Filed: Mar. 31, 1988

[86] PCT No.: PCT/JP88/00333

§ 371 Date: Nov. 29, 1988

§ 102(e) Date: Nov. 29, 1988

[87] PCT Pub. No.: WO88/07706

PCT Pub. Date: Oct. 6, 1988

[30] Foreign Application Priority Data

| | | | |
|---|---|---|---|
| Apr. 3, 1987 | [JP] | Japan | 62-82711 |
| Aug. 31, 1987 | [JP] | Japan | 62-215279 |
| Sep. 10, 1987 | [JP] | Japan | 62-225326 |
| Nov. 26, 1987 | [JP] | Japan | 62-296056 |

[51] Int. Cl.[5] .......... G06K 15/00
[52] U.S. Cl. .......... 220/456; 346/153.1
[58] Field of Search .......... 346/157, 150, 153.1, 346/135.1, 1.1, 160; 355/261; 156/DIG. 5, DIG. 11, DIG. 13; 358/140; 101/35-37, 39-44, 4; 220/3.1, 454-457, 62; 428/615

[56] References Cited

U.S. PATENT DOCUMENTS

| | | | |
|---|---|---|---|
| 4,422,749 | 12/1983 | Hoshino et al. | 355/261 |
| 4,692,810 | 9/1987 | Machii et al. | 358/140 |

*Primary Examiner*—Arthur G. Evans
*Attorney, Agent, or Firm*—Schwartz & Weinrieb

[57] ABSTRACT

Toners are sticked on a thin plate metal or a metallic container by electrophotographic-printing units (3), (4), and (5), and during the sticking processes, the toners are preliminarily fixed with a lower temperature and finally fixed with a higher temperature, thus being printed. A photoconductive material layer can be directly laminated on the surface of the thin plate metal or the metallic container or is disposed on a drum. A firm printed surface can be obtained by coating a finishing vanish on the toners.

3 Claims, 5 Drawing Sheets

MULTIPLE COLOR PRINTING METHOD FOR METALLIC CONTAINER AND THIN PLATE METAL AND PRINTED MATTER

TECHNICAL FIELD

This invention relates to a multiple color printing method for metallic containers and thin plate metals and to printed matters, and more particularly to a multiple color printing method for metallic containers and thin plate metals by utilizing an electophotographic printing technology capable of effectively printing small amounts of multiple kinds of products and of carrying out press-less printing and also relates to metallic containers and thin metal plates printed by the method described above.

BACKGROUND ART

Conventionally, a lithographic offset printing method, a letterpress printing method, a letterpress offset printing method, or a screen printing method is carried out as a multiple color printing method for thin metals such as metallic plates or metal foils, or metallic containers. The lithographic offset printing method is a method of the type in which an ink is applied to a picture-line portion of a lithograph provided with a picture-line portion of lipophilic property and a non-picture-line portion of hydrophilic property, the ink on the lithograph is transferred to a rubber blanket, and the ink on the rubber blanket is then printed on a material to be printed. The letterpress printing method is of the type in which an ink is applied to a picture-line portion in form of relief on a press and the ink is then printed on a material to be printed. The letterpress offset printing method is called in a sence a dry-offset printing method of the type in which an ink is applied to a picture-line portion of a letter press provided with a protruded picture-line portion and a recessed picture-line portion, the ink on the letterpress is transferred to a rubber blanket, and the ink on the rubber blanket is printed on a material to be printed. The screen printing method is of the type in which an ink is printed on a material to be printed by using a screen press provided with a picture-line portion only through which the ink is permeated. These conventional printing methods are superior in the mass production of the printed materials, but require the plates and the plate-making process beforehand the printing requires much time and labour. Recently, an electronic technique has been developed in the field of the printing technique, for example, computerization utilizing a layout scanner in an original manufacturing stage and development of a direct plate-making system in a plate-making process. However, no technique for eliminating the plate-making process has been yet developed, and accordingly, the defects described above have not been yet solved.

In addition, in accordance with the variety of the value judgements, there is an increasing requirement of the printing of the small amount of the multiple kinds of products and it becomes difficult to satisfy this requirement by the conventional methods which lack in an instantaneous printing function.

In the meantime, as a printing technique utilizing no printing press, are known an electrophotographic printing method, an ink-jetting methoc, or a thermo-transferring method, which are so called no-inpact printing technique in a case where paper is used as a material to be printed. According to these methods, a picture image can be directly obtained by a picture image output of a computer without using a printing press. Particularly, the electrophotographic printing method is utilized for a copying machine, facsimile, or printer and is watched as a method to be substituted for the conventional printing methods. As an application of the electrophotographic printing method to the printing technique, there is disclosed an apparatus for manufacturing a multiple color label in the Japanese Patent Laid-open Publication No. 23355/19874. The described invention is characterized by the multiple color label manufacturing apparatus wherein a photoconductive material is charged by charging devices in a plurality of electrophotographic printing devices, charged latent images are formed on the surface of the photosensitive material by projecting light corresponding to the original by means of an exposure by device, the latent images are visualized by sticking toners on the surface of the photosensitive material by means of a developing device, the toner images are realized on the surface of a base material for the label by means of a transferring device, and finally, the thus visualized images are fixed by means of fixing device. However, a multiple color printing technique for the metallic containers or thin plate metals in application of this electrophotographic printing technique has not been yet practically utilized.

An object of this invention is to improve the defects or drawbacks described above and to provide a multiple color printing method for a metallic container or thin metal plate capable of press-less printing utilizing no press.

Another object of this invention is to provide a multiple color printing method for a metallic container of thin metal plate capable of printing the small amount of multiple kinds of products by instantaneously printing picture image information of an original stored in the computer.

A further object of this invention is to provide a multiple color printing method capable of clearly or finely carrying out the printing on an extremely thin flat metal plate or a metallic container having a curved surface on which the printing is effected.

A still further object of this invention is to provide a multiple color printing method for a metallic container or a thin metal plate capable of including no crushed image due to the printing pressure which may be observed in the lithographic offset printing or a gravure printing.

By the way, in the application of the described electrophotographic printing technique to the multiple printing method for the metallic material, there is a problem on the fixing process.

When the paper is used as a material to be printed, the heat conductivity of the paper is small, so that the heating only of the surface thereof can be done, resulting in reduced energy consumption, and moreover, the cooling can be speedily made, thus being capable of performing high speed multiple color printing. On the other hand, when the metallic material is used as a material to be printed, since the heat conductivity thereof is large, it is difficult to heat only the surface thereof and the metallic material is entirely heated, resulting in the large consumption of heating energy. Moreover, in the multiple color printing, it is necessary to cool the material to be printed to a room temperature every color printing operation, thus being difficult to print the material at a high speed.

Accordingly, a still further object of this invention is to improve the problem described above and to provide a multiple color printing method of a thin metallic material capable of printing the same at a high printing speed with reduced energy consumption.

Furthermore, in the application of the electrophotographic printing technology to the multiple color printing method for a metallic container or thin metal plate, there is a problem on the transferring process. Namely, since the photoconductive layer and the metal have hard surfaces, the smooth registration between the metal and the toner cannot be obtained to carry out the clear transfer even if these surfaces are pressed with each other with the toner interposed.

With the metallic container, particularly a metallic can, since a spray coating or finish baking is applied to the inner surface thereof after the printing process, it is required for the toner to have a heat resisting property, and in the subsequent neck-in working or flange forming working, the flexibility and adhesive property are also required. In addition, in the steam sterilizing process at a temperature more than 100° C. after filling the content in the thus treated metallic can, it is also required for the toner to have a water-proof and heat-resisting properties. A printed material satisfied with the above requirements was not obtained by carrying out the heat fixing operation only to the toner by the electrophotographic printing method. This invention is conceived to solve this problem and aims to provide a multiple color printing method for a metallic container of thin metal plate capable of obtaining a strong printed material having an improved flexibility and adhesive property with no crushed picture image due to the printing pressure.

DISCLOSURE OF THE INVENTION

According to this invention, there is provided a multiple color printing method for a thin plate with n (n:natural number) colors characterized by the combination of the step of forming and preliminarily fixing picture images with (n-1) colors in accordance with an electrophotographic printing method, the step of forming the picture imgages with the last one color in accordance with the electrophotographic printing method and the step of really fixing the picture images with a temperature substantially higher than that required for the preliminary fixing step. Namely, according to this invention, in a case where a toner is fixed in correspondence to the picture pattern, in the printing steps with the colors other than last one color, the thin metal plate is heated to a temperature at which the toner is sticked (preliminarily fixed) to the thin metal plate and in the printing step with the last one color, the thin metal or thin metal plate and the toner are heated to a temperature at which the toner is fused (really fixed) to the thin metal plate. In the intermediate printing steps, since the metallic sheet is heated at a lower temperature, the sheet is easily cooled to a temperature required for the sticking of the toner in the succeeding printing step. Moreover, since a portion of the toner contacting the metallic sheet is fused and joined, the toner is fixed to the extent so as not to be moved against the abrasion of a magnetic brush in the next step. According to these steps, the toners of various kinds of colors are sticked on the metallic sheet in conformity with the picture pattern and the toners are then firmly sticked to the metallic sheet by heating the same to a temperature at which the toners are fused to the metallic sheet, thus obtaining a printed material.

Furthermore, according to this invention, there is provided a metallic container or thin metal plate having an outer surface on which a photoconductive layer, a toner image layer, and finish vanished layer are laminated in this order directly or through an electro-conductive covering layer.

Still furthermore, according to this invention, there is provided a multiple color printing method for a metallic container or a thin metal plate characterized by the steps of laminating a photoconductive layer on the surface of the metallic container of thin metal plate directly or through an electro-conductive covering layer, forming a toner particle picture image on the photoconductive layer by the electrophotographic printing method, fixing the toner particle picture image and coating a finishing vanish on the thus fixed picture image.

Still furthermore, according to this invention, there is provided a printing method wherein an electrically insulative material layer is laminated on the surface of the metallic container, a toner picture image formed by the electrophotographic printing method on a photoconductive layer is transferred on the electrically insulative material layer by the static electric force without contacting the layer and the finishing vanish is coated on the toner picture image after or before the toner picture is heated and fixed on the surface of the electrically insulative material layer. The metallic container is generally made with a thin metal plate, but is bent cylindrically with a curved outer surface, and hence is provided with high rigidity in the bent direction and the direction normal thereto. Accordingly, the metallic container can maintain the non-contactive condition with a distance closer to the photoconductive layer by urging the same towards the photoconductive layer through a spacer at both end portions which are formed as non-printed portion. Under these states, while rotating the metallic container and the photoconductive layer, by adding the static voltage between the metallic container and the photoconductive layer, the toner can be transferred from the photoconductive layer to the metallic container.

According to the metallic sheet printing apparatus of this invention, the press manufacturing process can be eliminated because the electrophotographic printing method is utilized and color adjustment can be easily performed. Picture image information of the original stored in the computer can be instantaneously printed and the color registration of the multiple color printing can be also extremely easily performed, thus accomplishing the printing of small amount of various kinds of products with an extremely short period. In addition, at the intermediate preliminary fixing of the electrophotographic printing unit, since the temperature increasing of the metallic sheet is low, the energy required for the heating is made reduced, and at the succeeding picture image formation of the electrophotographic printing unit, since the cooling process is achieved easily for a short time period, thus enabling the high speed operation. Moreover, since the electrophotographic printing method is utilized, the picture image formation to the metal plate to be printed can be carried out without substatially applying a pressure to the metal plate, so that it is possible to form the picture image on the flat metal plate having an extremely thin thickness or on a curved surface of the metal plate to be printed. Because of no-pressure applying printing, the ink never be crushed and the stain or spot of the printing due to the wear of the press is also never caused, thus always obtaining the even picture images. The coating of the finishing vanish is made on the toner, the printed surface can be made strong and the toner is thus protected by the coated finishiing vanish, so that the printed picture image having a good flexibility and adhesive property can be obtained.

BEST MODES FOR EMBODYING THE INVENTION

Figure 1:
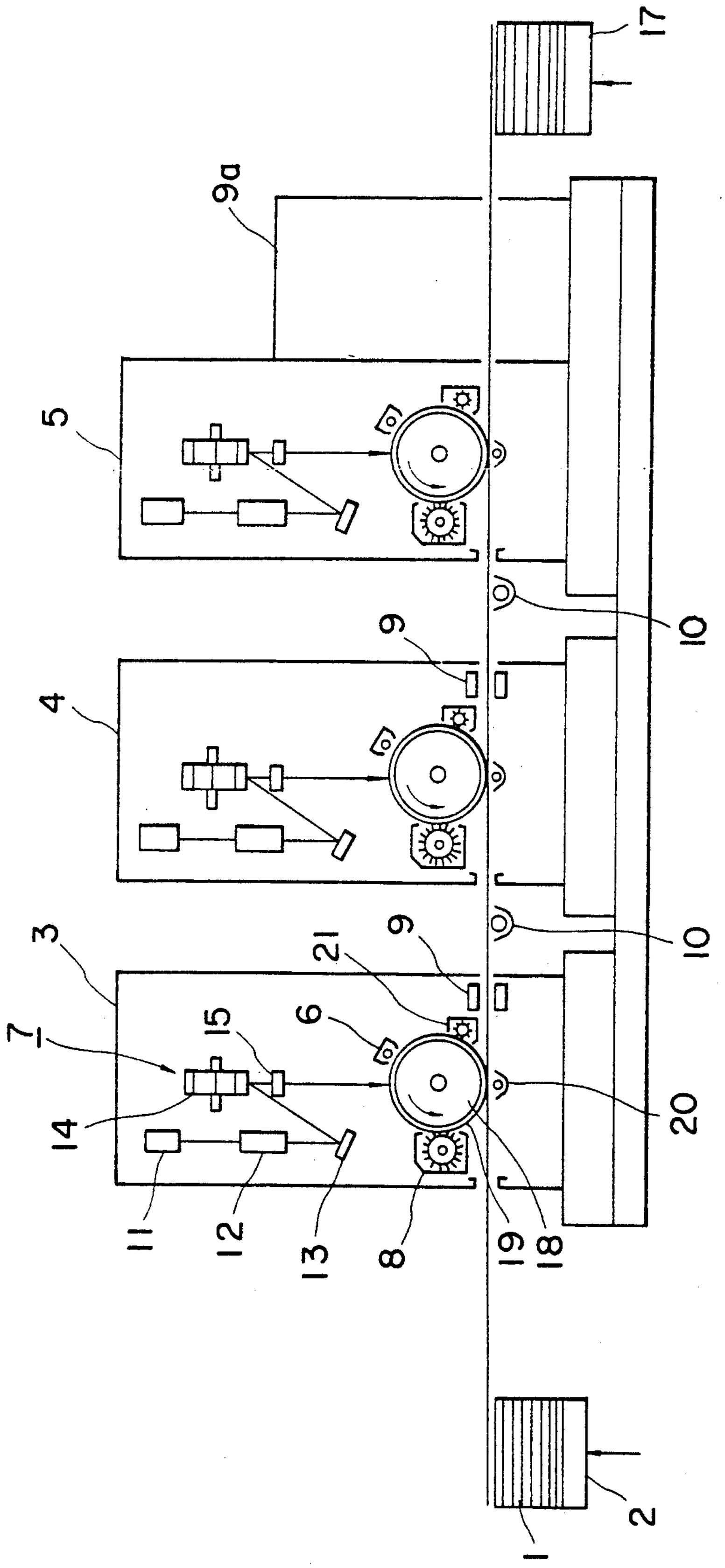
FIG. 1 is a side view, partially removed, of the first embodiment of this invention.

This invention will be described more in detail hereunder with reference to the embodiments shown in the accompanying drawings, in which like reference numerals are added to devices or members used commonly for the respective embodiments.

[First Embodiment]

The first embodiment according to this invention will be first described hereunder with reference to FIG. 1. Referring to FIG. 1, a reference numeral 1 denotes metallic sheets each on which a white coating having a thickness of about 10 to 20$\mu$ is laminated, and the metallic sheets 1 stacked on a sheet feeder 2 are taken out one by one by a conventionally known sheet supplying device. The metallic sheets are then conveyed to intermediate electrophotographic printing units 3 and 4 through feed rollers and guide members and finally to an electrophotographic printing unit 5 and then stacked on a piler 17. The electrophotographic printing unit 3 includes an electrically conductive member 18 in form of a drum around which is arranged a photoconductive material 19 formed with lamination of layers of a resin in which deposited amorphous silicon, deposited amorphous selenium or zinc oxide and an organic photoconductive material (polyvinyl carbazole, phthalocyanine or the like), the electrically conductive drum 18 being arranged to be rotatable in close contact to the metallic sheet 1. For the photoconductive material 19 there are provided a charging device 6 for charging the surface of the photoconductive material 19 with corona charge, an exposure device 7 for scanning laser beam on the laminate layer of the drum 18, a developing device 8 for sticking toners to a latent image obtained by the exposure device 7 and forming a picture image on the photoconductive material 19, a transferring device 20 for transferring the toners on the photoconductive material 19 to the resin layer on the metallic sheet 1 by utilizing the electric field, and a cleaning device 21 for removing the toner on the photoconductive material 19 by the brushing operation. The exposure device 7 comprises a laser beam oscillator 11, a light modulator 12, a mirror 13, a rotary polygon mirror 14, an f$\theta$ lens unit 15. The laser beam emitted from the laser beam oscillator 11 is modulated by the light modulator 12 in response to a signal from an image memory, and the modulated laser beam is concentrated on the photoconductive material 19 by the mirror 13, the rotary multiple surface mirror 14 and the f$\theta$ lens unit 15 and scanned in a direction normal to the advancing direction of the photoconductive material 19. The developing device operates such that the brushed front portions formed by the magnetic toners on the rotary sleeve rotating about a permanent magnet brush the surface of the photoconductive material 19 and the toners charged with polarity reverse to the surface of the photoconductive material is sticked to that surface by the frictional charging. A preliminary fixing device 9 for heating the metallic sheet by means of high frequency induction heating is arranged behind the photoconductive material 19. The high frequency induction heating can heat the metallic sheet to be heated without applying any pressure to the sheet, can be easily temperature-controlled, and can carry out the even heating for a short time period, whereby the toner particles can be fused to the metallic sheet without disturbing the position of the toner particles sticked to the metallic sheet with relatively weak static force. A cooling device 10 for cooling the metallic sheet 1 is arranged behind the preliminary fixing device 9, and in the cooling device 10, a surface of the metallic sheet 1 on which any picture image is not formed is contacted to a water-cooled metallic roll is cooled to a constant temperature. The cooled metallic sheet is then transferred to the next intermediate electrophotographic printing unit. According to this embodiment, in view of the transparency of the toners, cyan toners, Magenta toners, and yellow toners are respectively utilized for the first and second intermediate electrophotographic printing unit. With the second intermediate electrophotographic printing unit 4, substantially the same construction as that of the intermediate electrophotographic printing unit 3 is utilized except that the Magenta toner is utilized. The final electrophotographic printing unit 5 has substantially the similar construction to that of the intermediate electrophotographic printing unit 3 or 4 except that the yellow toner is utilized and a fixing device 9$a$ provided with an oven due to the induction heating method is substituted for the preliminary fixing device. The first embodiment according to this invention and having the construction described above will be operated as follows.

The photoconductive material 19 in the intermediate electrophotographic printing unit 3 is first uniformly charged by the electric charging device 6, and the charged photoconductive material 19 is then exposed by the exposure device 7 with respect to the picture image stored in the memory to thereby form a charged latent image. To the thus formed charged latent image, the cyan toner charged by the friction charging method is sticked. The toner is transferred to the laminated layer on the metallic sheet 1 passing a portion apart from the photoconductive material 19 by about 0.1 mm by means of the electric field applied by the transferring device 20. The toner remaining on the photoconductive material 19 is removed by the cleaning device 21, and the photoconductive material 19 is again electrically charged uniformly by the charging device 6. The toner sticked to the metallic sheet 1 is viscously sticked thereon by heating the metallic sheet 1 to about 60° C. by means of the preliminary fixing device 9. In the similar manner, in the intermediate electrophotographic printing unit 4, the Magenta toner is viscously sticked to the metallic sheet 1 in conformity with the picture image. In the final electrophotographic printing unit 5, the yellow toner is sticked to the metallic sheet 1 in conformity with the picture image. The metallic sheet 1 with the picture image formed by three color toners is then heated together with the toners to about 150° C. by the fixing device 9*a* to fuse the toners on the metallic sheet and piled thereafter on the piler 17. It is preferred that the temperature for the preliminary fixing operation is within the range of 50° to 150° C. for shortening the heating-cooling time of the thin metal and for sticking the toner on the metallic sheet, whereas it is also preferred that the temperature for the real fixing operation is generally ranged between 100° to 250° C. for fusing the toner on the thin metal.

The developing device 8 is a device adapting a dry-type developing method according to the described embodiment, but a liquid developing device, in which the toner particles absorbing ions and electrically charged are dispersed and suspended in an insulative liquid such as petroleum solvent or olefin solvent such as isoparaffin, carbon tetrachloride, floride chloride ethylene and siloxian, and the toner particles are sticked to the photoconductive layer by the Coulomb force. With the described first embodiment, although the cyan toner, Magenta toner and the yellow toner are utilized respectively in the first intermediate elelctro-printing unit, the second intermediate electrophotographic printing unit and the final electrophotographic printing unit, this invention is not limited to this embodiment and various modification may be made. For example, the yellow toner is utilized in the first electrophotographic printing unit, and the cyan toner and the Magenta toner may be utilized in the second intermediate electrophotographic printing unit and the final electrophotographic printing unit, respectively. In addition, as occasion demands, the number of the intermediate electrophotographic printing unit may be increased for forming the picture image with the black toners. These toners are prepared by dispersing, into a binder, pigments such as dis-azo yellow, carmine 6B, copper phthalocyanine and carbon black. As the binder it is desired for the present invention to use a mixture of a wax or thermoplastic resin having a viscosity at a low temperature heating and a thermosetting resin having a thermosetting ability at a high temperature heating. As the thermoplastic resin, acrylic resin or polyester resin may be used, and as the thermosetting resin, an epoxy resin or polyurethane resin may be used. The surface of the printed material by the electrophotographic-printing method may be preferably coated by finishing vanish though not disclosed herein. For example, a strong printed material can be obtained by coating with the finishing vanish and thereafter really fixing the same after the transfer of the yellow toner by means of the final electrophotographic printing unit as it is or further after the preliminary fixing process. [Second Embodiment]

Figure 2:
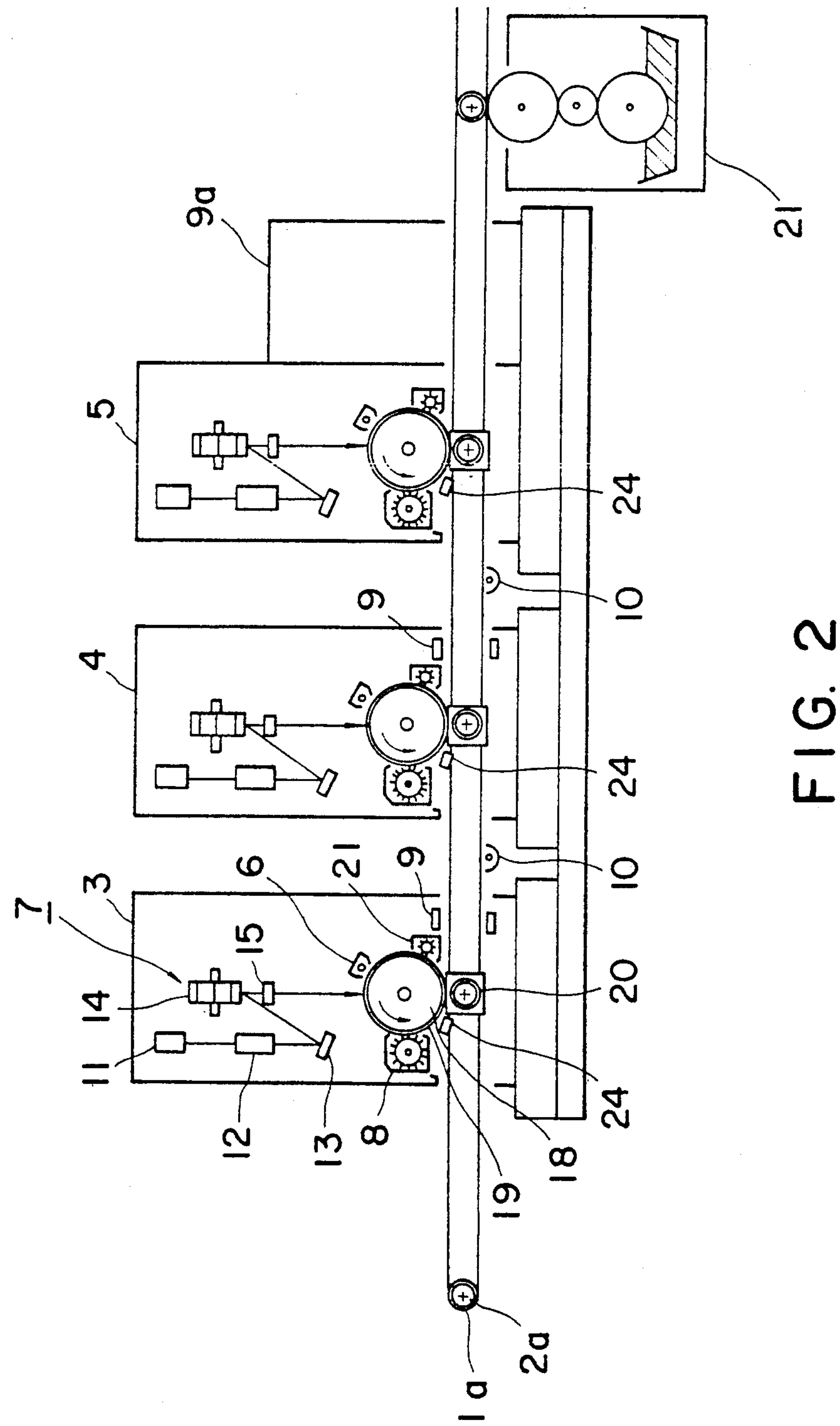
FIG. 2 is a side view, partially removed, of the second embodiment of this invention.
Figure 3:
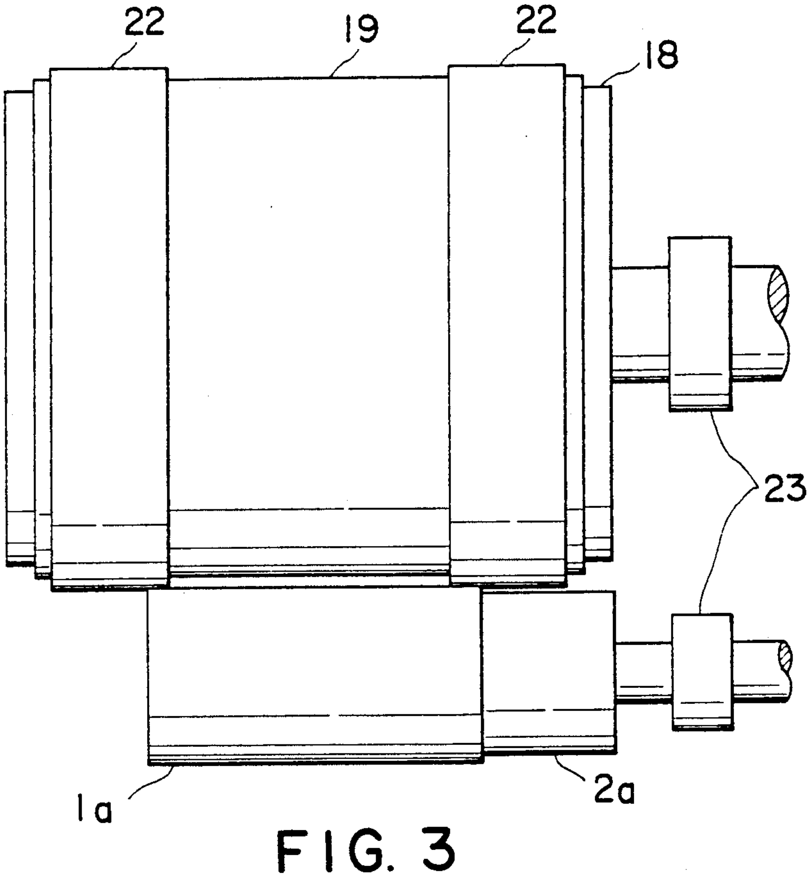
FIG. 3 is a front view, partially removed, of a transferring device 20 of the second embodiment.
Figure 4:
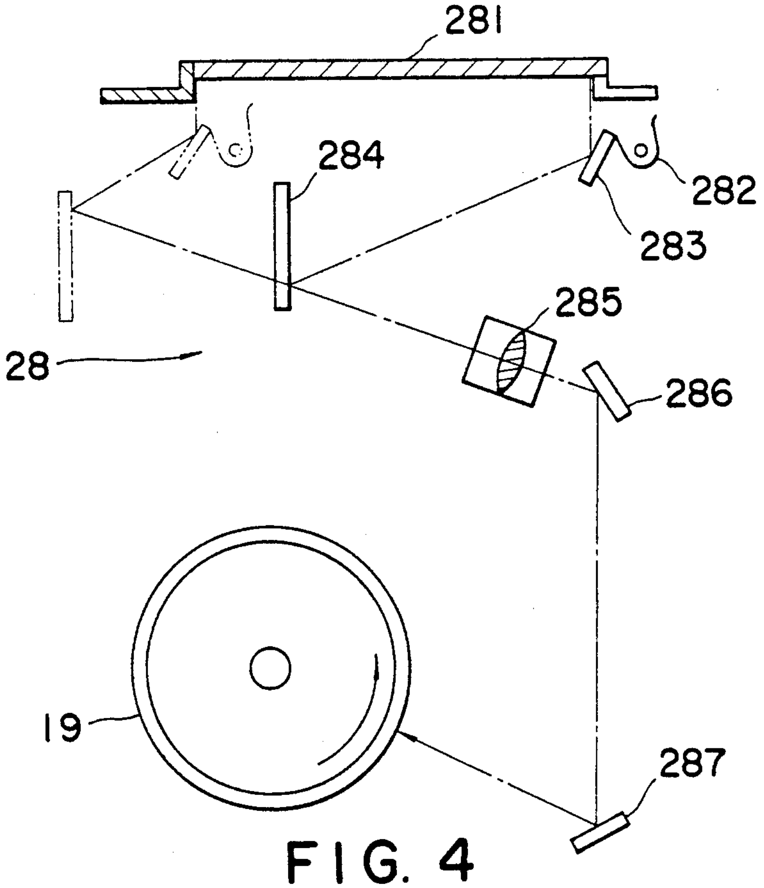
FIG. 4 is a side view of an exposing device utilized for the respective embodiments.

Another embodiment according to this invention represented by FIG. 2 will be described hereunder. FIG. 2 is a side view, partially removed, of the second embodiment of this invention, and referring to FIG. 2, reference numeral 1*a* denotes a metallic container having a surface on which a white coating is laminated with the thickness of about 10 to 20μ. The metallic containers mounted to mandrels 2*a* having an electroconductivity are fed one by one to the intermediate electrophotographic printing units 3 and 4 and the final electrophotographic printing unit 5 through feed devices and guide members which are not illustrated. The mandrels 2*a* are once stopped, as described hereinafter, at the location of the transferring device 20 and rotated there. The metallic containers 1*a* are thereafter conveyed to a finishing vanish coating device 21. The electrophotographic printing unit 3 includes an electrically conductive member 18 in form of a drum around which is arranged a photoconductive material formed with a lamination of layers in which deposited amorphous silicon, deposited amorphous selenium or zinc oxide and an organic photoconductive material (polyvinyl carbo zole, phthalocyanine or the like), the electro-conductive drum 18 being arranged to be rotatable in close contact to the metallic container. There are provided for the photoconductive material 19 an electrically charging device 6, an exposure device 7, a developing device 8, a transferring device for transferring the toners on the photoconductive material 19 to the resin layer of the metallic container 1*a* by the action of the electric field, and a cleaning device for removing the toners remaining on the photoconductive material 19 by the brushing operation. The exposure device 7 has substantially the same construction as that described with respect to the first embodiment. In the second embodiment, in the formation of a multiple color picture image, since the electrophotographic printing method is utilized, the positional registering of the picture images of the respective colors is carried out by detecting the register points on the metallic can by a detector 24, synchronizing the image outputs from the computer in response to signals from the detector and forming the latent image on the photoconductive material 19. In the developing device 8, a brushed portion formed by the magnetic toner on a sleeve rotating around a permanent magnet rubs the surface of the photoconductive layer to thereby stick the toner charged with a polarity reverse to that of the photoconductive layer to that layer due to the friction charging. Concerning the transferring device 20, the front view, partially removed, thereof is shown in FIG. 3. Thin insulating spacers 22 are disposed on the photoconductive material 19 for forming a minute gap between the metallic container 1*a* and the photoconductive material 19 at two locations outside of the picture limit of the image to be printed on the metallic container 1*a*. The axis of the mandrel 2*a* is urged by an urging force through these spacers towards the photoconductive material 19, and the distance between the metallic container 1*a* and the photoconductive material 19 is maintained to be 0.05 to 0.1 mm. In order to apply the electric field between the metallic container 1*a* and the photoconductive material 19, electrodes 23 respectively contact to the axis of the electroconductive mandrel 2*a* and the electroconductive drum 18. Since the metallic container 1*a* and the photoconductive material 19 is maintained with the gap by means of the spacers 22 and are rotated by the electrodes 23 under the application of the electric field, the picture images of the toners can be transferred on the resin layer of the metallic container 1*a*. A preliminary fixing device 9 for heating the metallic container by the induction heating is arranged behind the photoconductive material 19. Further behind the device 9 is arranged a cooling device 10. The intermediate electrophotographic printing unit 4 has substantially the same construction as that of the intermediate electrophotographic printing unit 3, and in the final electrophotographic printing unit 5, the preliminary fixing device is substituted with a fixing device constituted by an oven carrying out the induction heating. The preliminary fixing device operates such that an eddy current is induced to the metallic container by passing the same in the high frequency magnetic field created by a heating coil in which high frequency current flows to thereby heat the metallic container by the Joule heat to the predetermined temperature. The second embodiment of this invention thus constructed will operate as follows. The photoconductive material 19 in the intermediate electrophotographic printing unit 3 is first uniformly charged by the electric charging device 6, and the charged photoconductive material 19 is then exposed by the exposure device 7 with respect to the picture image stored in the memory to thereby form a charged latent image. To the thus formed charged latent image, the cyan toner charged by the friction charging method is sticked. The toners are transferred to the laminated surface of the metallic container 1*a* rotating with distance of 0.05 to 0.1 mm from the photoconductive material 19 with the insulative spacers 22 interposed by means of the transferring device 20 under the application of the electric field in order of 2.5 to 3.5 kv. The toner remaining on the photoconductive material 19 is removed by the cleaning device 21, and the photoconductive material 19 is again uniformly charged by the charging device for the next printing operation. The toners sticked to the metallic container 1*a* is viscously fixed thereto when the metallic container 1*a* is heated to about 60° C. by the preliminary fixing device 9. According to substantially the similar manner, the Magenta toner and the yellow toner are viscously fixed to the metallic container 1*a* in corresponding to the picture images respectively in the intermediate electrophotographic printing unit 5. The metallic container 1*a* with the picture images formed by three color toners is then heated together with the toners to about 150° C. by means of the fixing device 9*a*, and after fusing the toners on the metallic container 1*a*, the finishing vanish is coated on the surface of the metallic container by utilizing the finishing vanish coating device 21. The temperature for the preliminary fixing is generally preferably in the range of 50° to 150° C. for sufficiently shortening the heating-cooling period and fusing the toners to the metallic container. In addition, the temperature for the real fixing is preferably in the range of 100° to 250° C. for fusing the toners to the metallic container. FIG. 4 is a side view showing another exposure device to be applicable to this embodiment, and in case this exposure device is utilized, the exposure device 7 shown in FIG. 2 is substituted with an exposure device 28 shown in FIG. 4. Referring to FIG. 4, reference numeral 281 denotes an original table on which originals of respective colors are mounted, reference numeral 282 denotes a lighting lamp and reference numeral 283 denotes a mirror, these elements being moved from positions shown by solid lines to positions shown by dotted lines at constant speed when the exposure is carried out. A mirror 284 is also moved similarly from a position shown by solid line to a position shown by dotted line. In the shown exposure device, at a time when the registered position on the metallic container 1*a* is detected by the detector 24, the lighting lamp 282, and the mirrors 283 and 284 start to be moved from the positions shown by the solid lines, and the light refrected on the band like portion of the original on the original table 281 is concentrated on the photoconductive material 19 through passages on the dotted lines, i.e. through mirror 283, mirror 284, lens 285, mirror 286 and mirror 287. As described, the exposure is performed in the band like form, so that the exposing time can be reduced in comparison with the use of the exposure device shown in FIG. 2 in which the exposure is performed in the dot like form. With this embodiment, the fixing device 9*a* and the finishing vanish coating device 21 shown in FIG. 2 may be alternatively arranged, and according to this alternative arrangement, the picture images of the toners are heat fixed after the finishing vanish has been coated on the toner picture images transferred on the metallic container. According to these processes, the strong printed material on the metallic container can be obtained. The developing device or toners usable for this embodiment and the order of the toners are substantially the same as those described with respect to the first embodiment.

[Third Embodiment]

Figure 5:
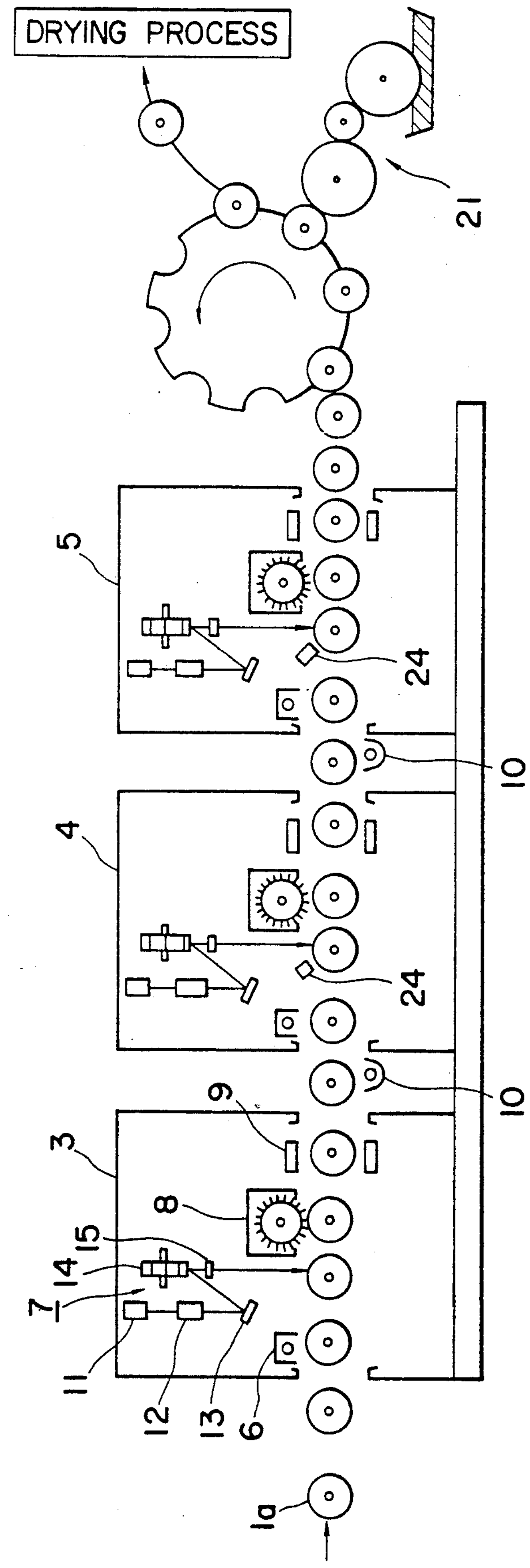
FIG. 5 is a side view, partially removed, of the third embodiment of this invention.

FIG. 5 is a side view, partially removed, of the third embodiment according to this invention. In this embodiment, a drawn and ironed can formed by drawning, re-drawning and ironing workings was used as a material to be printed. A photoconductive layer in which zinc oxide powders are dispersed in the acrylic resin binder to sensitize coloring matters is used for the metallic container of the described type and is coated by a known mandrel coater. The metallic container 1*a* with the photoconductive material coated is mounted to the mandrel, not shown, is fed to the electrophotographic printing units 3, 4 and 5 through the mandrel and the mandrel feed chain while once stopping at the respective units and rotating to be subjected to the printing operation, and after the finishing vanish has been coated by the mandrel coater 21, the metallic container 1*a* is fed to a heating oven and dried there. Thereafter, a spray coating for the inner surface of the metallic container, a baking, a neck-in working and a flange-forming working are carried out to obtain a completed product of the metallic can. The electrophotographic printing units 3, 4 and 5 are each provided with a electric charging device 6 for charging the photoconductive layer on the metallic container with a corona charging method, an exposure device 7 for scanning laser beams on the photoconductive layer, a developing device 8 for sticking toners to a latent picture image obtained by the exposure device to form the image on the metallic container, a fixing device 9 for fusing the toners and fixing the same on the metallic container, and a cooling device 10 for cooling the metallic container. The exposure device 7 has the construction substantially the same as that of the first embodiment. With this third embodiment, in the formation of the multiple color picture image, the electrophotographic printing method is utilized, so that the position registering of the respective color picture images is carried out by detecting the registering points on the metallic container by means of a detector 24, and synchronizing the picture image outputs from the computer in response to signals from the detector 24, thereby forming the latent image on the metallic container. In the developing device, a brushed portion formed by the magnetic toner on a sleeve rotating around a permanent magnet rubs the surface of the photoconductive layer of the metallic container to thereby stick the toner charged with a polarity reverse to that of the photoconductive layer to that layer due to the friction charging. In the fixing device, an eddy current is induced to the metallic container by passing the metallic container in the high frequency magnetic field created by a heating coil through which the high frequency current flows to thereby heat the metallic container by the Joule heat to a desired temperature. The heat of the metallic container is absorbed by a mandrel cooled by a cooling device not shown before the metallic container is conveyed to the next electrophotographic printing unit. The surface of the metallic container may be also cooled by the cooling device 10. A thermoinsulating member to be disposed between the mandrel and the metallic container is designed so as to be sufficiently cooled before the metallic container reaches the next electrophotographic printing unit. In consideration of the transparencies of the toners, in this third embodiment, the cyan toner, the Magenta toner and the yellow toner are utilized for the electrophotographic printing units 2, 3 and 4, respectively. The surface of the metallic can on which the colored picture image is printed is coated with the finishing vanish by utilizing the mandrel coater 21, thus obtaining a strong printed material. This embodiment having the construction described above will operate as follows. The layer of photoconductive material (photoconductive layer) of the metallic container is subjected to negative corona electric charging uniformly by the electric charging device 6 during the passing through the electrophotographic printing unit 3. When, in the next step, the thus charge layer is exposed by the exposure device 7 in correspondence with the picture image stored in the memory, the exposed portion is made electroconductive and the charged particles flow towards the metallic side to lose the charges thereof and the negative charges only remain on the uncharged portion, thus resulting in the formation of the charged latent image corresponding to the picture image. The cyan toner positively charged by the friction charging is sticked to the metallic container by the static electric force by the developing device 8 to form a visual image, and thereafter the thus treated metallic container is transferred to the fixing device 9. In the fixing device 9, the metallic container is heated by the high frequency heat induction method and hence portion of the toner contacting the metallic container is fused to provide the viscous property, thus the toner being fixed to the metallic container. With the electrophotographic printing unit 4, in substantially the same manner, the picture image due to the Magenta toner is formed and with the electrophotographic printing unit 5, the picture image due to the yellow toner is formed. The metallic container with the picture image thus formed by the three color toners is coated with the finishing vanish by the mandrel coater 21 and then heated and baked by the oven. The exposure device 7 in this embodiment utilizes a method of scanning the laser beam in the visual zone on the photoconductive layer, but in a case where a color element as a sensitizer is not added to the zinc oxide photoconductive material, a laser beam in the ultraviolet zone may be utilized. The exposure device 7 of this embodiment may be substituted with the device shown in FIG. 4 representing the second embodiment. A developing device and color order of toners capable of being utilized for this invention are substantially the same as those described with reference to the first embodiment. The toners to be utilized are prepared by dispersing, into the binder resin, a tinting agent such as dis-azo yellow, benzidine yellow, supramine yellow, Rhodamine, Quinacridone, carmine 6B, copper phthalocyanine, or carbon black. As the binder, the wax, thermoplastic resin or thermosetting resin will be utilized. A polyslyrene resin, polyolefin resin, acrylic resin, or polyester resin may be utilized as the thermoplastic resin, and as the thermosetting resin, is utilized an epoxy resin or polyurethane resin. A charge controlling agent, a fluidity-improving agent or a viscous sticking preventing agent may be additionally applied as occasion demands. The inner surface spray coating and the baking treatment are required for the metallic container, particularly metallic can, after the printing operation, and it is also required for the toners to be endowed with the heat-resisting property. The neck-in working and flange forming working are thereafter carried our, which require the flexibility and the adhesive property. Furthermore, the steam sterilization is performed at a temperature more than 100° C. after a content is filled in the metallic can and a hot-water withstanding property is required for the toners. Accordingly, it is preferred to use a thermosetting resin such as epoxy resin as the binder for the toners. An organic photoconductive material such as polyvinyl carbazole, polyvinyl carbazole/Trinitrofluorenone phthalocyanine or anthracene other than a material in which the zinc oxide or titanium oxide powder is dispersed in an acrylic resin, alkid resin, epoxy resin, silicone resin or polyester resin will be preferably utilized for the photoconductive material. A photoconductive layer prepared by depositing amorphous silicon or amorphous selenium may by utilized. Although the photoconductive layer is disposed directly on the surface of the metallic container, an electroconductive coating layer may be disposed between the metallic container surface and the photoconductive layer. As the electroconductive coating layer, an electroconductive filler made of such as aluminum, nickel, copper, carbon, or graphite is dispersed in a binder resin such as acrylic resin, alkid resin, epoxy resin, of polyester resin. The finishing vanish is coated for the purpose of protecting the toner layers and giving gloss to the metallic container surface. Namely, with the metallic can, the toner layers may be damaged, abrased or peeled by the damages caused by the collision of the respective metallic cans or contact of the can to the feed guide members or the like during the conveyance thereof after the printing operation. In addition, the toner layers may be softened or decolored by the steam sterilization at a temperature more than 100° C. after filling content in the metallic can. In view of these facts, it is necessary to coat the finishing vanish on the metallic can surface for protecting the toner layers. As the finishing vanish, acrylic resin, polyester resin, epoxy resin, alkid resin, or amino resin may be utilized and the use of the acrylic resin or polyester resin may be preferred.

[Fourth Embodiment]

Figure 6:
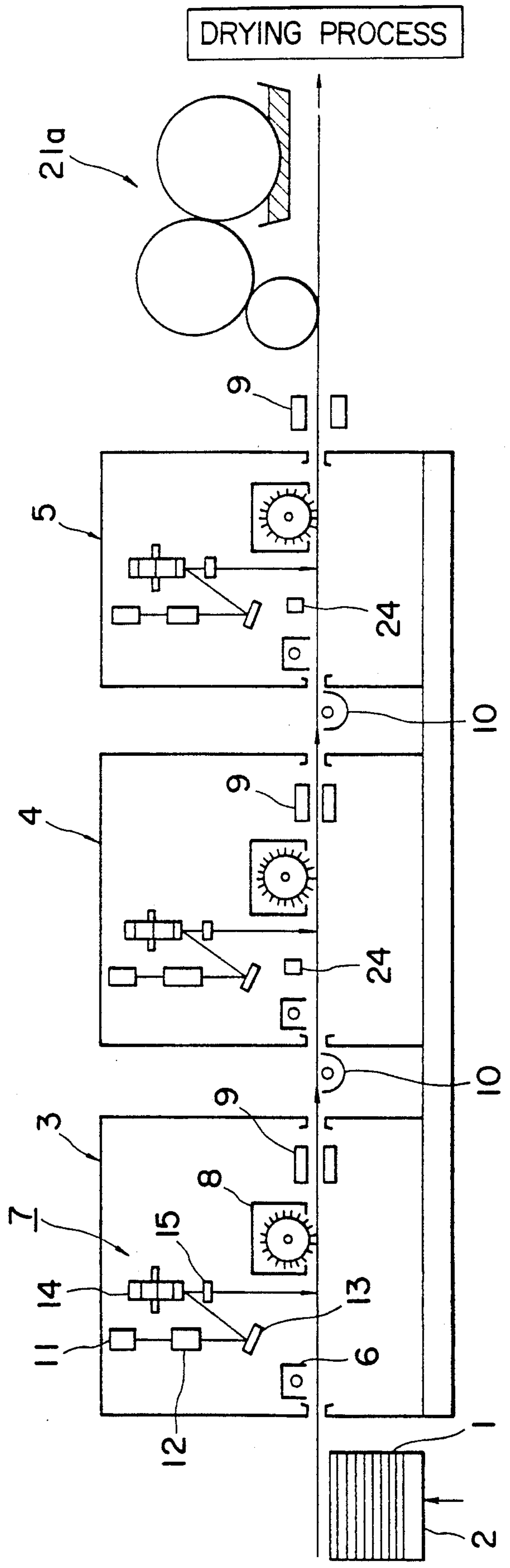
FIG. 6 is a side view, partially removed, of the fourth embodiment of this invention.

The fourth embodiment according to this invention will be described hereunder with reference to the accompanying drawing. FIG. 6 is a side view, partially removed, of the fourth embodiment according to this invention, and referring to FIG. 6, reference numeral 1 designates a metallic sheet having a surface on which an amorphous silicon or amorphous selenium is deposited or a resin in which zinc oxide or titanium oxide is dispersed or organic photoconductive material (polyvinyl carbazole or phthalocyanine) is laminated. The thus prepared sheet is electrically charged and then exposed to make conductive the exposed portion, whereby the charged particles flow towards the metallic sheet and lose their charges to thereby form a photosensitized material. The metallic sheets 1 pailed on a sheet feeder 2 are taken out one by one by a known sheet feeding device and fed to the intermediate electrophotograpgic printing units 3 and 4 and the final electrophotograpgic printing unit 5 by means of feed rollers and guide members, not shown. The metallic sheets 1 are thereafter coated with the finishing vanish by the finishing vanish coating device 21*a* and then fed to be subjected to the drying process. The intermediate electrophotograpgic printing unit 3 is provided with a charging device 6 for electrically charging the layer laminated on the metallic sheet with a corona charging method, an exposure device 7 for scanning the laser beam on the charged surface, a developing device 8 for sticking toners to a latent image obtained by the exposure device to form the picture image on the metallic sheet, a fixing device 9 for heating the metallic sheet by the induction heating to fix the toner on the metallic sheet, and a cooling device 10 for cooling the metallic sheet. The exposure device 7 has substantially the same construction as that of the first embodiment. In the developing device, the brushed end portions formed by the magnetized toners on the sleeve rotating about the permanent magnet rubs the laminated layer on the metallic sheet to thereby stick the toner charged with a polarity reverse to that of the laminated layer to the layer by the friction charging. In the fixing device, an eddy current is induced to the metallic sheet by passing the metallic sheet through the high frequency magnetic field caused by a heating coil through which high frequency current passes, thus heating the metallic sheet to a desired temperature by the Joule heat. In the cooling device, the metallic sheet is cooled to a constant temperature in contact of a water-cooled metallic roll to the surface of the metallic sheet on which no picture image is formed, and the thus cooled metallic sheet is fed to the next intermediate electrophotographic printing unit. In view of the transparency of the toners, according to this embodiment, the cyan toner, the Magenta toner and the yellow toner are respectively utilized in the first, second and final electrophotographic printing units. The structure of the second intermediate electrophotographic printing unit 4 is substantially the same as that of the first intermediate electrophotographic printing units 3 except for the use of the Magenta toner instead of the cyan toner. The structure of the final electrophotographic printing unit is also substantially the same as that of the first or second intermediate electrophotographic printing unit 3 or 4 except the use of the yellow toner instead of the cyan or Magenta toner. The embodiment having the construction described above operates as follows. The metallic sheet passing the intermediate electrophotographic printing unit 3 is first electrically charged by the charging device 6 to uniformly charge the photoconductive layer. The thus charged layer is exposed in the exposure device 7 in conformity with the picture image stored in the memory means to thereby form the latent image corresponding to the picture image. The cyan toner charged by the friction charging method is sticked to the thus charged latent image in the developing device 8 and the metallic sheet thus formed is then transferred to the fixing device 9, the metallic sheet is heated by the induction heating method to provide the viscosity to the portions of the toners contacting the metallic sheet and the toners are viscously sticked to the metallic sheet. In the like manner, in the intermediate electrophotographic printing unit 4, the Magenta toner is viscously sticked to the metallic sheet in conformity with the picture image. In addition, in the final electrophotographic printing unit 5, the yellow toner is sticked in conformity with the picture image, whereby the metallic sheet provided with three-color picture image formed is heated by the fixing device 9 and fused on the metallic sheet, and the metallic sheet is fed to the finishing vanish coating device 21*a* in which the finishing vanish is coated on the toner layer. The metallic sheet coated with the finishing vanish is then subjected to the drying process through which the sheet is dried, thus obtaining a strong printed surface of the metallic sheet.

INDUSTRIAL USAGE

The surface of the metallic container manufactured according to this invention is coated with the finishing vanish on the toner layer of the metallic container, so that the strong printed surface can be obtained, and the toner is thus protected by the finishing vanish, so that the good flexibility and adhesive property can be attained. The fine and beautiful printing is suitable for containers for foods. The containers for foods can also be manufactured by using the thin plate metal manufactured in accordance with this invention.

We claim:

1. A laminated metallic container, comprising:
a photoconductive material layer disposed upon the surface of said metallic container;
at least one toner picture image layer disposed upon said photoconductive material layer; and
a varnish finish layer disposed upon said at least one toner picture image layer.

2. A container as set forth in claim 1, wherein:
said at least one toner picture image layer comprises three toner picture image layers whereby a multiple color picture image is disposed upon said metallic container.

3. A container as set forth in claim 1, further comprising:
an electroconductive layer interposed between said metallic container surface and said photoconductive material layer.

* * * * *